United States Patent [19]

Barta

[11] Patent Number: 4,484,657
[45] Date of Patent: Nov. 27, 1984

[54] ACOUSTIC PULSE GENERATOR

[75] Inventor: Henry R. Barta, Plano, Tex.

[73] Assignee: Atlantic Richfield Company, Los Angeles, Calif.

[21] Appl. No.: 310,006

[22] Filed: Oct. 13, 1981

[51] Int. Cl.³ .......................................... G01V 1/147
[52] U.S. Cl. .................................. 181/121; 181/117; 181/401
[58] Field of Search ................ 175/1; 227/130; 91/25, 91/519, 24; 173/134; 367/144; 181/110, 117, 119, 120, 401

[56] References Cited

U.S. PATENT DOCUMENTS

| | | | |
|---|---|---|---|
| 1,629,845 | 5/1927 | Stevens | 91/24 |
| 3,288,244 | 11/1966 | Kirby | 181/119 |
| 4,114,723 | 9/1978 | Paitson et al. | 181/119 X |
| 4,280,248 | 7/1981 | Herubel | 227/130 X |
| 4,284,164 | 8/1981 | Airhart | 181/117 |
| 4,284,165 | 8/1981 | Airhart et al. | 181/117 X |

Primary Examiner—Maynard R. Wilbur
Assistant Examiner—K. R. Kaiser
Attorney, Agent, or Firm—Robert M. Betz

[57] ABSTRACT

Apparatus for generating an acoustic pulse in a medium wherein an impact piston is driven downwardly along a cylindrical housing by compressed gas to strike a rigid target positioned in contact with the earth. In its firing position, the tapered upper portion of the piston extends above the top of the housing within a container occupied by the compressed gas, the top of the piston being at the same time recessed within a gastight mating enclosure at the top of the container. In this position, the tapered piston surface is constantly exposed to circumferential gas pressure so as to provide a positive breakaway force. Upon release of suitable piston latch means, the piston is first urged downwardly by this breakaway force and thereafter accelerated more powerfully when the top of the piston separates from the enclosure and becomes exposed to gas flow uniformly from all directions.

4 Claims, 3 Drawing Figures

ACOUSTIC PULSE GENERATOR

BACKGROUND OF THE INVENTION

I. Field of the Invention

This invention relates generally to the field of seismic prospecting and more particularly to a method and apparatus for injecting an acoustic pulse into the earth.

II. Description of the Prior Art

U.S. Pat. No. 4,284,165 issued Aug. 18, 1981 entitled "Acoustic Pulse Generator" describes apparatus incorporating means for driving an impact piston downwardly by compressed air to strike an earth contacting target. In accordance with this patent, compressed gas is provided by high volume accumulators interconnected with large area ports which penetrate the side wall of the housing in which the impact piston is slideably operated. The piston wall is upwardly tapered and presses against seals mounted on the correspondingly tapered housing bore above and below the entry ports. In this way, a constant breakaway force is exerted on the tapered piston wall through the ports. In operation, when the piston is released, compressed gas enters the housing bore through the ports when the top of the piston drops away from its upper seal means.

U.S. Pat. No. 4,284,164 issued Aug. 18, 1981 entitled "Acoustic Pulse Generator", also describes related apparatus incorporating means for driving a piston downwardly by compressed air to strike an earth-contacting target. As distinguished from U.S. Pat. No. 4,284,165, the piston in this patent has a side wall of constant diameter so that no initial downward breakaway force is exerted on the piston. The construction disclosed, however, also employs a side-ported housing for admission of air pressure, which reaches the top piston surface only after piston release occurs.

The invention to be described hereafter represents an improvement on the method and apparatus of the above prior art patent which is more particularly concerned with the means for efficient exploitation of compressed gas as a driving force in an impact device of this character.

It is therefore a general object of the present invention to provide an acoustic pulse generator of the type described with improved mass acceleration means.

It is a more particular object of the present invention to provide improved means for applying pressurized gas as an energy source in an acoustic pulse generator of the type described.

It is a still more specific object of the present invention to maximize the speed of operation of an acoustic pulse generator of the type described.

Other and further objects and advantages of the invention will become apparent from a consideration of the detailed description and drawings to follow.

SUMMARY OF THE INVENTION

In accordance with the preferred embodiment of this invention, a hollow cylindrical housing having an open top and an open bottom is adapted to be supported in a substantially upright position above a rigid earth contacting target. An impact piston having a tapered or frusto-conical upper portion is slideably interfitted within the housing and adapted to be driven into contact with the target. In its upper firing position, the piston is supported so that the tapered surface extends upwardly into a container of compressed gas which is operatively interconnected with the open top of the housing. In this position, the top surface of the piston reaches within and is sealingly isolated from gas pressure by a mating cylindrical enclosure inside the container. In this manner, a uniform downward breakaway force is exerted by the gas over the entire circumference of the tapered piston surface. When the piston is released from its support, gravity fall is first aided by the breakaway force on the tapered surface and thereafter accelerated rapidly as the compressed gas is provided a path uniformly from all directions to the top surface of the piston.

In an alternate embodiment of the apparatus of this invention, the impact piston, as described, is of uniform diameter so that no initial breakaway force is exerted by gas pressure as described above. In a further alternate embodiment of this invention, the impact piston comprises two or more sections of differing diameter which are joined by tapered or squared shoulder portions. These shoulder portions are exposed to gas pressure in the initial firing portion of the piston. Their effective horizontal extent determines the total initial breakaway force exerted on the impact piston in its firing position.

DESCRIPTION OF THE PREFERRED EMBODIMENTS

Figure 1:
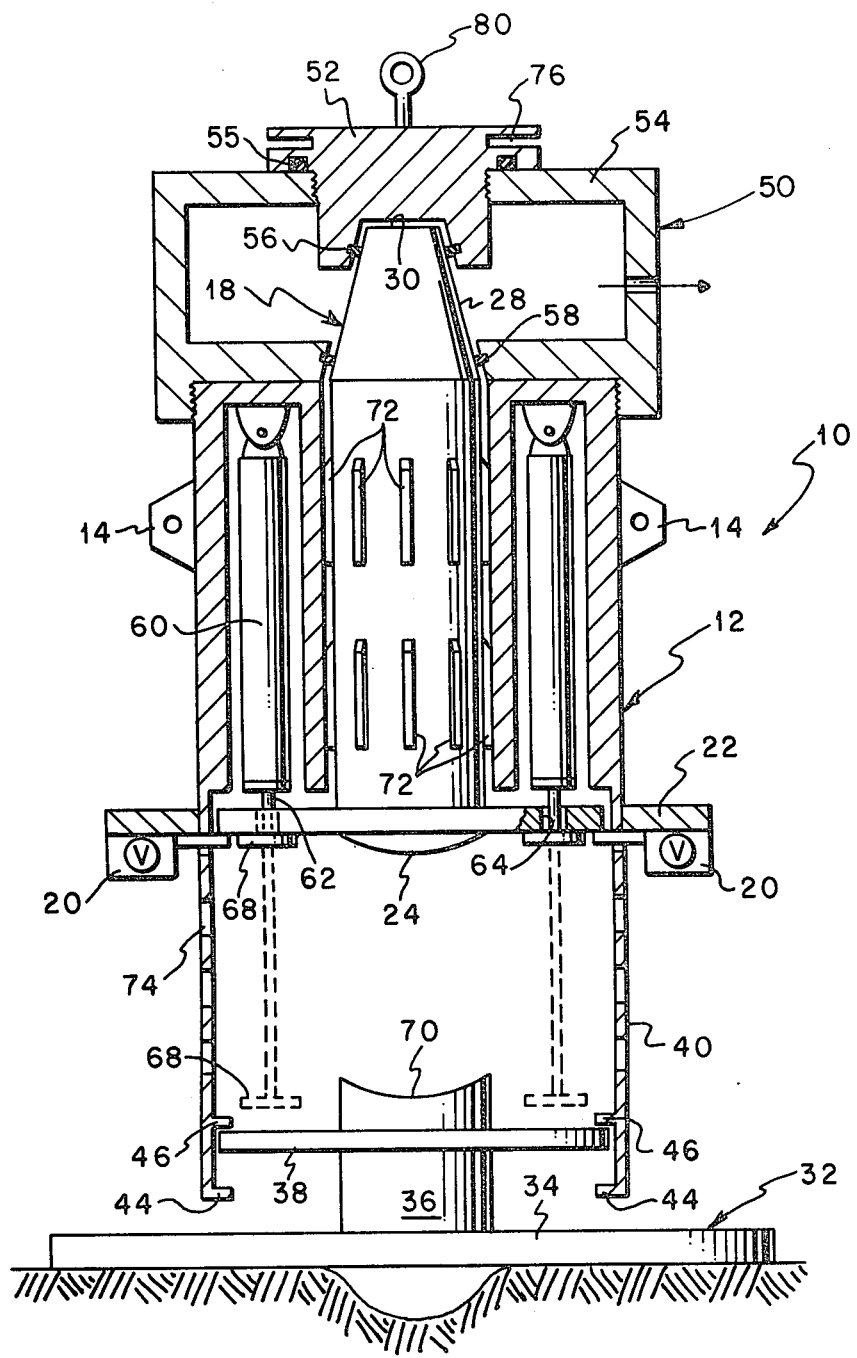
FIG. 1 is a sectional view, partially in elevation, of an apparatus in accordance with a preferred embodiment of this invention prior to firing.

With reference now to FIG. 1, there is illustrated an acoustic pulse generating apparatus 10 in accordance with a preferred embodiment of this invention. A hollow cylindrical housing 12 is adapted to be supported in an upright position. This may be accomplished, for example, by attachment of brackets 14 to the handling device of a transporting vehicle (not shown). An impact piston 18 is normally retained securely adjacent the upper end of the housing 12 by means of quick release electrically controlled latches 20. The lower end of the piston 18 is provided with an enlarged diameter plate 22 having a convex central portion 24. The upper end of the piston 18 is provided with an upwardly tapered wall 28 terminating in upper face 30. Adjacent the lower end of the housing 12, a target plate 32 is positionable on the surface of the earth or other medium in axial alignment with impact piston 18 and in spaced relation thereto. The target plate 32 consists generally of the bottom plate 34 and an upstanding central pillar 36 from which a flange 38 extends radially to a point adjacent the lower side wall 40 of the housing 12. The lower end of side wall 40 is provided with inwardly extending ribs 44 and 46. Rib 44 extends radially beneath flange 38 to enable pickup of target plate 32 for transport or deployment from one position to another. Rib 46, in like manner blocks undesired upward travel of target 32 relative to housing 12.

Situated above housing 12, and threadably joined thereto, is a container 50 of compressed gas such as an accumulator, which is periodically replenished from a larger source (not shown). In the upper support position of piston 18, its tapered surface 28 extends within container 50 while its top surface 30 is adapted to be recessed within a mating downwardly opening cylindrical enclosure 52 threadably inserted in the upper wall 54 of container 50. Static seals 56 and 58 carried by the bore of enclosure 52 and the bore of housing 12, respectively, are contacted by tapered piston surface 28 in its upper support position. In this manner, gas pressure from container 50 is prevented from escaping downwardly within housing 12 or upwardly within enclosure 52 to contact the top surface 30 of piston 18. Seals 56 and 58 are preferably of the commercial variety, known as Poly Pak ®, to insure maximum confinement of gas pressure within container 50. When enclosure 52 is seated as shown, "O" ring seal 55 insures that container 50 is airtight at the top after piston 18 drops away from enclosure 52.

It is a feature of this invention that when piston 18 is in the upper firing position as shown, a breakaway downward gas pressure is exerted uniformly over the entire circumference of tapered surface 28 between upper and lower seals 56 and 58. By extending piston 18 directly into a high volume accumulator, such as container 50, situated directly above the piston housing 12, the need for a ported housing such as described in the aforementioned U.S. Pat. Nos. 4,284,164 and 4,284,165 is eliminated. The apparatus as described herein is adaptable to the use of any degree of taper for surface 28 of piston 18. A positive breakaway force can be achieved with a very low angle of taper such as 2%.

Another feature of this invention is that it minimizes the time for pressure build-up on top surface 30 (and hence the speed of piston travel to the target) from the instant tapered piston surface 28 and separates from seals 56 and 58. This is accomplished by elimination of all mechanical structure which could interfere with equal fluid mass flow to the top surface 30 from any direction, as described. This in turn insures that the energy of a compressed gas supply of any given capacity is utilized with maximum efficiency in driving piston 18 downward.

On either side of the piston 18, there are positioned hydraulic lift cylinders 60 with lift rods 62 extending through apertures 64 in piston impact plate 22. The lower ends of lift rods 62 are provided with lift rings 68. Preparatory to the operation of generator 10, lift rods 62 are lowered to assume the dotted position as shown. Upon completion of the firing operation, lift rings 68 are effective to engage plate 22 and return piston 18 to its initial ready position.

In operation, latches 20 are electrically operated and withdrawn so that impact piston 18 is free to fall downward away from seal rings 56 and 58. At this moment, the constantly present breakaway force against surface 28 is aided by the gas pressure which sweeps in uniformly from all sides of the piston above the top 30. Piston 18 is then driven downwardly with high velocity so that convex impacting surface 24 delivers a blow to mating concave upper surface 70 of pillar 36 to generate the desired acoustic pulse. During the downward motion of piston 18, it is maintained in proper axial position by means of guide strips 72 affixed to and extending longitudinally along the surface of piston 18. The upper ends of guide strips 72 are beveled to ensure proper mating with the bore of housing 12 on return of piston 18 to its upper position. Lower housing wall 40 is provided with suitable air vents 74 to ensure no air pressure build-up occurs beneath piston 18 to lessen the effective kinetic energy.

In the event replacement of seals 56 and 58 is necessary in field operations, enclosure 52 may be removed by the insertion of suitable turning bars (not shown) in cavities 76. Enclosure 52 may also be provided with a lift ring 80 for convenient hoisting and lowering of the entire generator 10.

It is evident that, if desired, the seals 56 and 58 may be replaced by correspondingly located male seals (not shown) on the upper and lower ends of the tapered surface 28 of piston 18.

Figure 2:
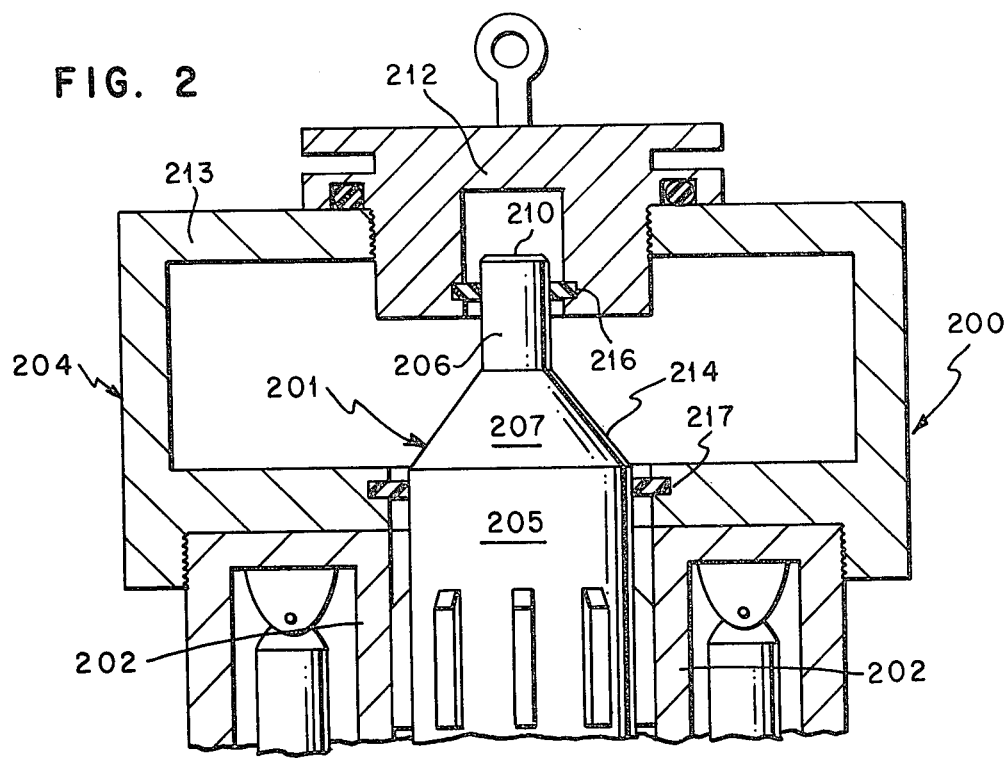
FIG. 2 is a detached sectional view of an apparatus in accordance with an alternate embodiment of this invention

FIG. 2 illustrates in detail the upper portion of an acoustic pulse generator 200, in accordance with an alternate embodiment of this invention. It will be understood that except as hereinafter described, the apparatus and mode of operation of generator 200 is substantially similar to that of the apparatus of FIG. 1.

An impact piston 201 is supported upwardly in its firing position within upright open-ended cylindrical housing 202 so as to extend within compressed gas container 204. Piston 201 comprises a lower portion 205 of constant diameter adopted to slide within the bore of housing 202, an upper portion 206 of reduced constant diameter, and a tapered intermediate portion 207. As shown, the top surface 210 of piston 201 partially intrudes within an airtight recess formed in downwardly opening cap 212 threadably joined to the top 213 of container 204. The tapered wall 214 of intermediate portion 207 is constantly exposed in the upper firing position to downward breakaway pressure from the compressed gas within container 204. Static upper seal 216 isolates top surface 210 from gas pressure while corresponding seal 217 prevents pressure from escaping downwardly within the bore of housing 202. In operation, piston 201 is released from its support by means (not shown) similar to those shown in FIG. 1. When piston 201 clears seal 216, gas flows to top surface 210 uniformly from all directions. Thus, the total downward thrust on piston 201 is the combination of force upon tapered wall 214 and top surface 210. This piston construction possesses the advantage of providing an initial breakaway or "cocking" force, but not requiring precise vertical positioning. That is to say, top portion 206 need only make contact with upper seal 216.

It is evident that piston portion 207 may, if desired, be eliminated so as to convert tapered wall 214 into a horizontal or "square" shoulder portion of piston 201 (not shown). Any combination of "stepped" reductions in diameter of the impact piston is equally feasible so as to create any desired amount of initial breakaway force on the impact piston.

Figure 3:
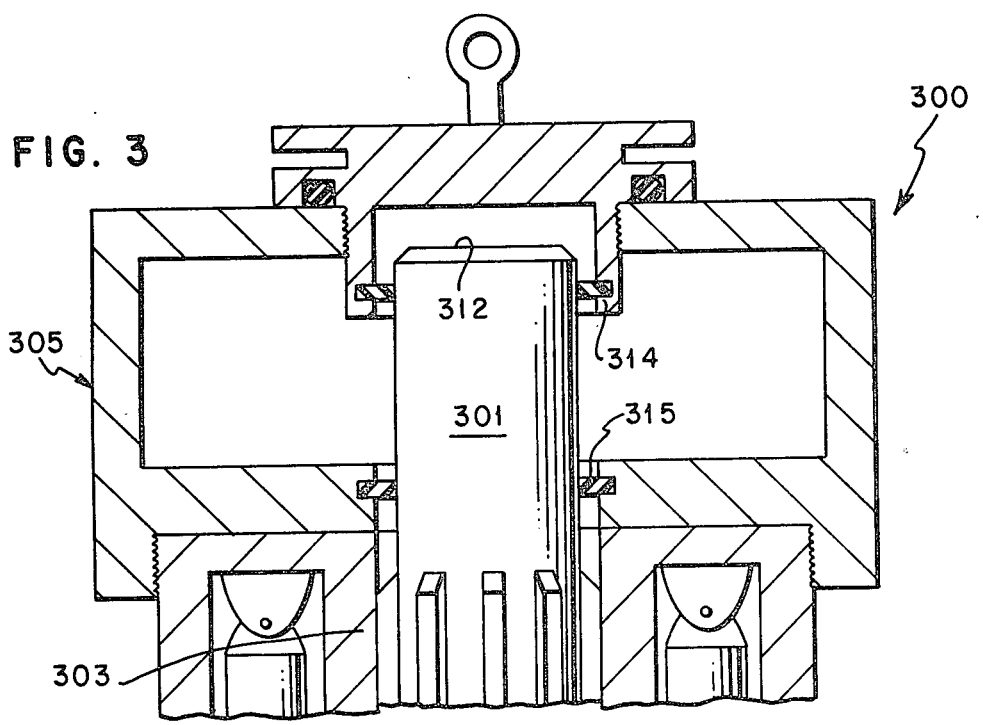
FIG. 3 is a detailed sectional view of an apparatus in accordance with a further alternate embodiment of this invention.

FIG. 3 shows a detail of a further alternate embodiment of this invention similar, except as described, to that of FIG. 1. Acoustic generator 300 comprises impact piston 301 of uniform diameter extending in a support or firing position above the open top of housing 303 into the interior of compressed gas container 305. Enclosure 310 receives the upper end of piston 301 so that top surface 312 is within its airtight recess and thereby isolated from gas pressure. Pressure is confined within container 305 by means of upper and lower seals 314 and 315 as shown.

In this embodiment, no initial breakaway force is applied to piston 301 prior to firing. In operation, piston 301 drops beneath seal 314 upon release so as to provide a path for gas pressure uniformly from all sides to top surface 312, after the manner of this invention.

It is understood that the preceding description and the accompanying drawing are illustrative only of a preferred embodiment of this invention; therefore, without departing from the scope of this invention as set forth in the appended claims, those skilled in the art will be able to make many modifications in the configuration and relative position of parts of the apparatus as described and shown.

Having thus described the present invention, I claim:

1. An acoustic pulse generator comprising:
   (a) a hollow cylindrical housing having an open top and open bottom and adapted to be supported upright above a rigid earth-contacting target;
   (b) an impact piston slideably interfitted within the bore of said housing, a portion of the wall of said piston being inwardly tapered to form a reduced diameter top surface;
   (c) a container of compressed gas operatively interconnected with the top of said housing so as to permit gas flow therebetween;
   (d) means for supporting said piston in spaced relation to said target so that said tapered wall portion extends upwardly from said housing to within said container and is thereby exposed to constant downward gas pressure uniformly about its circumference;
   (e) means positioned in fixed relation to said container forming a downwardly opening cylindrical enclosure above said piston into which the top of said piston is urged slideably in said support position so as to isolate the top piston surface from said gas pressure; and,
   (f) means for disabling said support means, the resultant initial downward movement of said piston from within said enclosure means enabling the top surface thereof to be exposed to a flow of said gas so as to produce a circumferentially uniform downward pressure thereon, thereby causing said piston to be accelerated downwardly to the target by the combined pressures on said tapered piston wall and top surface.

2. Apparatus as in claim 1 wherein said compressed gas container is an upright hollow cylinder and said enclosure means forms part of the top thereof.

3. An acoustic pulse generator comprising:
   (a) a hollow cylindrical housing having an open top and open bottom and adapted to be supported upright above a rigid earthcontacting target;
   (b) an impact piston slideably interfitted within the bore of said housing, a portion of the wall of said piston being inwardly tapered to form a reduced diameter top surface;
   (c) an upright hollow cylinder operatively interconnected with the top of said housing so as to permit gas flow therebetween;
   (d) a quantity of compressed gas within said cylinder;
   (e) means for supporting said piston in spaced relation to said target so that said tapered wall portion extends upwardly from said housing to within said cylinder and is thereby exposed to constant downward gas pressure uniformly about its circumference;
   (f) means threadably inserted in the top of said cylinder for providing a downwardly opening cylindrical enclosure above said piston into which the top of said piston is urged slideably in such support position so as to isolate the top piston surface from said gas pressure; and
   (g) means for disabling said support means, the resultant initial downward movement of said piston from within said enclosure means enabling the top surface thereof to be exposed to a flow of said gas so as to produce a circumferentially uniform downward pressure thereon, thereby causing said piston to be accelerated downwardly to the target by the combined pressures on said tapered piston wall and top surface.

4. Apparatus as in claim 3 wherein the wall of said piston is provided with an annular seal adapted in said support position to contact the inner wall of said enclosure means so as to interrupt the gas flow path to said top piston surface, said seal being disengaged by said initial downward piston movement.

* * * * *